(12) United States Patent
Kester et al.

(10) Patent No.: US 11,147,277 B2
(45) Date of Patent: Oct. 19, 2021

(54) CONVEYOR TUNNEL OVEN

(71) Applicant: Wolfe Electric, Inc., Wichita, KS (US)

(72) Inventors: Dale Kester, Wichita, KS (US); Skyler Martinez, Wichita, KS (US)

(73) Assignee: Wolfe Electric, Inc., Wichita, KS (US)

( * ) Notice: Subject to any disclaimer, the term of this patent is extended or adjusted under 35 U.S.C. 154(b) by 168 days.

(21) Appl. No.: 16/431,103

(22) Filed: Jun. 4, 2019

(65) Prior Publication Data
US 2019/0281838 A1    Sep. 19, 2019

(51) Int. Cl.
*A21B 1/48*     (2006.01)
*A21B 1/26*     (2006.01)

(52) U.S. Cl.
CPC . *A21B 1/48* (2013.01); *A21B 1/26* (2013.01)

(58) Field of Classification Search
CPC ... A21B 1/48; A21B 1/26; F24C 15/36; F24C 7/08; A47J 37/044; A47J 37/045; B66B 11/0226; E04B 2002/7466; E04F 13/083
See application file for complete search history.

(56) References Cited

U.S. PATENT DOCUMENTS

| | | | |
|---|---|---|---|
| 801,690 A | 10/1905 | Ralls | |
| 2,044,516 A * | 6/1936 | Teller | F24C 15/023 126/194 |
| 2,259,382 A * | 10/1941 | Ingels | E04C 2/08 403/326 |
| 3,145,289 A | 8/1964 | Swetlitz | |
| 3,318,299 A | 5/1967 | Lewis | |
| 3,328,927 A * | 7/1967 | Kates | B66B 11/0253 52/65 |
| 3,404,931 A * | 10/1968 | Fall | A47B 47/03 312/265.4 |
| 3,425,405 A | 3/1969 | Dills | |
| 3,448,678 A * | 6/1969 | Burstein | A21B 2/00 99/386 |
| 3,589,274 A | 6/1971 | Murray | |

(Continued)

FOREIGN PATENT DOCUMENTS

| | | |
|---|---|---|
| EP | 1175346 | 8/2003 |
| FR | 2126127 | 5/1973 |

(Continued)

*Primary Examiner* — Jorge A Pereiro
(74) *Attorney, Agent, or Firm* — Kenneth H. Jack; Davis & Jack, L.L.C.

(57) ABSTRACT

A conveyor tunnel oven incorporating forwardly opening baking case having a rear wall, a longitudinal wall, an oppositely longitudinal wall, an upper wall and a lower wall, the case being further opened by a longitudinal food passage port and an oppositely longitudinal food passage port; a continuous loop conveyor within the baking case, the conveyor extending to the longitudinal and oppositely longitudinal food passage ports; a panel having a forward surface, the panel being fitted for closing the baking case's forward opening; a pair of "L" hooks, each "L" hook including a helically threaded stem and a foot, the hooks positioning the panel over the baking case's forward opening; and a "J" hook having a stem and a tail, the tail having a distal end and a throat engaging the "L" hooks' feet so that the "J" hook's stem overlies the panel's forward surface.

14 Claims, 4 Drawing Sheets

(56) References Cited

U.S. PATENT DOCUMENTS

| | | | | |
|---|---|---|---|---|
| 4,295,693 A * | 10/1981 | Viklund | A47B 47/03 | 211/135 |
| 4,296,982 A * | 10/1981 | Kullander | A47B 47/03 | 211/135 |
| 4,296,983 A * | 10/1981 | Rogers | A47B 47/03 | 312/263 |
| 4,423,574 A * | 1/1984 | Pierre | E06B 9/02 | 49/63 |
| 4,848,311 A | 7/1989 | Dorri | | |
| 4,860,918 A * | 8/1989 | Wuyten | E04H 1/1238 | 220/668 |
| 4,923,076 A * | 5/1990 | Weiss | B65D 88/14 | 220/1.5 |
| 4,924,973 A * | 5/1990 | Miller | B66B 11/0226 | 160/368.1 |
| 4,937,986 A * | 7/1990 | Way, Sr. | E04D 13/076 | 210/474 |
| 5,277,105 A | 1/1994 | Bruno et al. | | |
| 5,299,557 A * | 4/1994 | Braithwaite | F24C 15/2042 | 126/299 R |
| 5,421,320 A | 6/1995 | Brown | | |
| 5,590,640 A * | 1/1997 | Kollias | A47J 37/0786 | 126/201 |
| 5,630,435 A * | 5/1997 | Brouchoud | B08B 3/006 | 134/183 |
| 5,664,554 A * | 9/1997 | Martin | F24C 15/36 | 126/201 |
| 5,928,540 A * | 7/1999 | Antoine | F24C 15/006 | 219/391 |
| 6,064,041 A | 5/2000 | Staffieri | | |
| 6,089,658 A * | 7/2000 | Law | A61G 5/12 | 297/219.1 |
| 6,120,118 A * | 9/2000 | Dean | G06F 1/181 | 312/223.2 |
| 6,131,559 A * | 10/2000 | Norris | F24C 15/006 | 126/21 A |
| 6,252,201 B1 * | 6/2001 | Nevarez | A21B 1/26 | 126/21 A |
| 6,302,095 B1 * | 10/2001 | Tolley | A47J 37/0704 | 126/201 |
| 6,457,922 B1 * | 10/2002 | Tsai | F16B 13/0858 | 411/55 |
| 6,802,165 B1 * | 10/2004 | Passeno | E04F 13/0862 | 52/288.1 |
| 6,905,332 B1 | 6/2005 | Neal et al. | | |
| 7,604,000 B2 | 10/2009 | Wolfe | | |
| D661,975 S * | 6/2012 | Mahaffey | | D8/343 |
| 8,210,844 B2 | 7/2012 | Wolfe | | |
| 8,286,400 B1 | 10/2012 | Wolfe | | |
| D670,553 S * | 11/2012 | Mahaffey | | D8/343 |
| 8,536,493 B1 | 9/2013 | Wolfe | | |
| 8,776,773 B1 | 7/2014 | Wolfe | | |
| 8,952,298 B2 | 2/2015 | Fietsam et al. | | |
| 9,861,212 B1 * | 1/2018 | Muth | F25D 23/063 | |
| 9,907,436 B2 | 3/2018 | Reese et al. | | |
| 2005/0054085 A1 * | 3/2005 | Nagy | C05F 17/907 | 435/290.1 |
| 2008/0032018 A1 * | 2/2008 | Garniss | A21B 3/04 | 426/523 |
| 2008/0149087 A1 * | 6/2008 | Wolfe | F24C 15/325 | 126/21 A |
| 2009/0008379 A1 | 1/2009 | Ingemanson | | |
| 2009/0313932 A1 * | 12/2009 | Montgomery | E04F 13/081 | 52/408 |
| 2010/0180509 A1 * | 7/2010 | Pridemore | E04F 19/08 | 49/465 |
| 2011/0192391 A1 | 8/2011 | Bevilacqua et al. | | |
| 2011/0210113 A1 * | 9/2011 | Lauer | A47J 37/044 | 219/209 |
| 2011/0303100 A1 * | 12/2011 | Agnello | A47J 37/0807 | 99/443 C |
| 2012/0085746 A1 * | 4/2012 | Fietsam | A21B 1/22 | 219/395 |
| 2012/0211645 A1 * | 8/2012 | Tullo | A61L 2/10 | 250/214 AL |
| 2014/0110414 A1 * | 4/2014 | Piendl | F25D 23/065 | 220/592.02 |
| 2014/0312025 A1 * | 10/2014 | Raghavan | F24C 15/006 | 219/400 |
| 2015/0241069 A1 | 8/2015 | Brant et al. | | |
| 2017/0345522 A1 * | 11/2017 | Campbell | G21F 5/005 | |
| 2018/0177199 A1 * | 6/2018 | Pitlor | A21B 1/48 | |
| 2019/0055737 A1 * | 2/2019 | Aboukhalil | E04F 13/0803 | |
| 2020/0207585 A1 * | 7/2020 | Gettling | B66B 11/0226 | |
| 2020/0321573 A1 * | 10/2020 | Confer | H01M 2/0469 | |

FOREIGN PATENT DOCUMENTS

| | | |
|---|---|---|
| GB | 2533761 | 7/2016 |
| JP | 2007092906 | 4/2007 |
| JP | 20111240581 | 12/2011 |

\* cited by examiner

CONVEYOR TUNNEL OVEN

FIELD OF THE INVENTION

This invention relates to conveyor tunnel ovens. More particularly, this invention relates to conveyor tunnel ovens which incorporate an attachable and detachable panel type front wall, and which incorporate a forwardly overlying heat shielding wall.

BACKGROUND OF THE INVENTION

Conveyor tunnel ovens are known to incorporate a panel configured front wall which is alternatively attachable and detachable. During cooking use of such ovens, the attachable and detachable front panels often become heated to a temperature at which physical contact by an operator against the outer forward surface of the panel produces painful skin burning.

To lessen the risk of such skin burning contact, protective auxiliary panels are known to be attached to the oven at a position forwardly overlying the removable front panel. While such protective auxiliary panels define protective and insulating air gaps, such auxiliary panels are often difficult to mechanically attach and detach, and such auxiliary panels often mechanically interfere with access to underlying fasteners which are provided for facilitating attachment and detachment of the removable panel.

The instant inventive conveyor oven solves or ameliorates the problems and challenges discussed above by providing a specially configured burn protecting auxiliary panel which incorporates a specially configured series of interlocking hooks which function consonantly with the oven's front panel securing fasteners.

BRIEF SUMMARY OF THE INVENTION

The instant inventive conveyor tunnel oven preferably comprises a box configured baking case which includes a forwardly opening front, a rear wall, a longitudinal wall, an oppositely longitudinal wall, an upper wall, and a lower wall, each such wall having a heat insulating thickness. In the preferred embodiment, the inventive oven further includes longitudinal and oppositely longitudinal food passage ports which respectively open the case at the longitudinal and oppositely longitudinal walls. A cooking grate type continuous loop food carrying conveyor extends longitudinally through the interior of the baking case and has ends respectively protruding longitudinally and oppositely longitudinally from the longitudinal and oppositely longitudinal food passage ports. The inventive oven preferably further comprises upper and lower ranks or series of air impingement air registers which overlie and underlie the food conveyor. Such registers are suitably configured as finger ducts which direct blower driven air from a plenum manifold toward food items carried upon the conveyor for heated air impingement cooking.

A further structural component of the instant inventive conveyor tunnel oven comprises a rectangular insulated panel which is fitted for covering the baking case's forward opening.

Mechanical fasteners such as screws with enlarged heads are provided for removably attaching the front panel at its case opening covering position.

Further structural components of the instant inventive conveyor tunnel oven comprise first and second "L" hooks, each of which comprises a helically threaded stem component and a foot component. In the preferred embodiment, the forward end of the baking case presents helically threaded sockets which are upwardly positioned upon the case rightwardly and leftwardly, or longitudinally and oppositely longitudinally. Upon a forward opening covering positioning of the case's front panel, such sockets may align with provided upper fastener receiver eyes within the front panel.

In the preferred embodiment of the instant invention, such alignable sockets and eyes are closely fitted for sliding receipts of the "L" hooks' helically threaded stems. Following such receipts, clockwise turning of the stems securely engage their outer helical threads with the sockets' inner helical threads. Such threaded engagements securely forwardly cantilever the stems for suspending support of the oven's forward panel. The "L" hooks' foot components advantageously resist any panel detaching forward sliding movement of the forward panel along the "L" hooks' stems.

In the preferred embodiment, the "L" hook feet components of the instant invention comprise upturned portions of disk configured panel retaining heads, such heads preferably being fixedly and rigidly attached to the forward ends of the "L" hooks' stems. Accordingly, the instant invention advantageously allows the oven's panel fastening screws to dually or additionally function as a hooking means.

A further structural component of the instant inventive conveyor tunnel oven comprises a "J" hook having an upwardly oriented tail and a downwardly extending stem. In the preferred embodiment, the "J" hook's tail component is specially configured to define a channel configured throat which extends in the longitudinal/oppositely longitudinal direction. In the preferred embodiment, the "J" hook's throat is specially shaped and sized for closely nestingly receiving and engaging both of the upturned feet of the invention's "L" hook components. The "J" hook's stem component is preferably panel configured and is rectangularly sized and shaped to co-extensively cover the front face of the oven's removable front panel.

In use of the instant invention, an oven operator may easily and conveniently carry the invention's "J" hook component, utilizing distal end of its upper tail component in the manner of a carry handle. Thereafter, the user may manually orient the "J" hook component so that the tail's downwardly opening throat upwardly overlies the upturned distal ends of the "L" hooks' foot components. Thereafter, the "J" hook may be manually lowered until such feet nestingly enter the throat of the "J" hook's tail, advantageously hookingly engaging the "J" hook with the "L" hooks.

In such assembled configuration, the "J" hook's panel configured stem component advantageously functions as a auxiliary burn protecting wall which forwardly overlies the front panel's forward surface to form a heat insulating air gap. During cooking use of the oven, the front surface of the "J" hook's stem component remains substantially cooler than the front surface of the front panel's rearwardly underlying front surface, advantageously protecting skin contacts from burning. Multiple "J" hook configured auxiliary panels are easily and conveniently attachable and detachable to a stacked series of conveyor tunnel ovens.

Accordingly, objects of the instant invention include the provision of a conveyor tunnel oven which incorporates structures, as described above, and which arranges those structures in relation to each other for the achievement of the beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
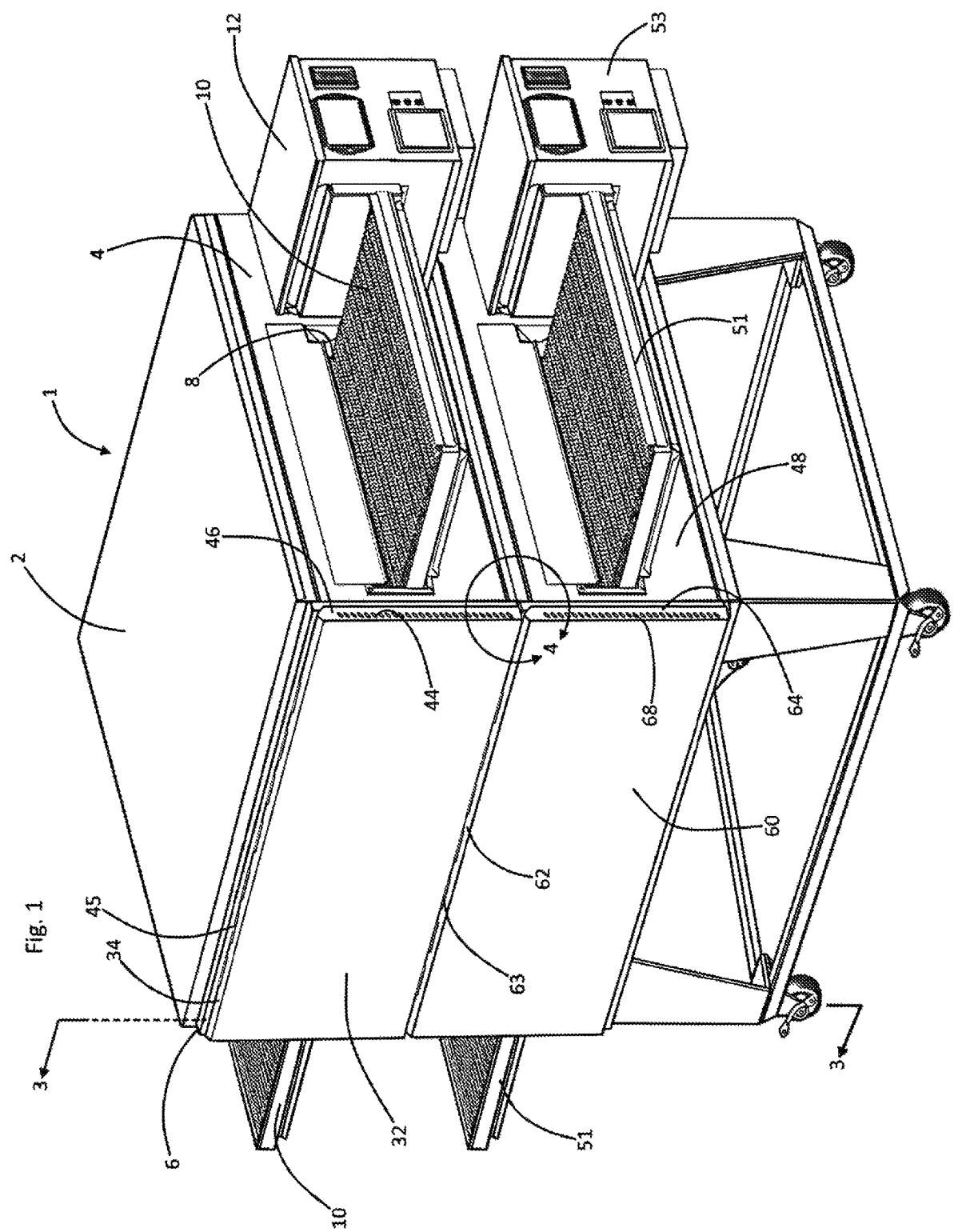
FIG. 1 is a perspective view of the instant inventive conveyor tunnel oven.
Figure 2:
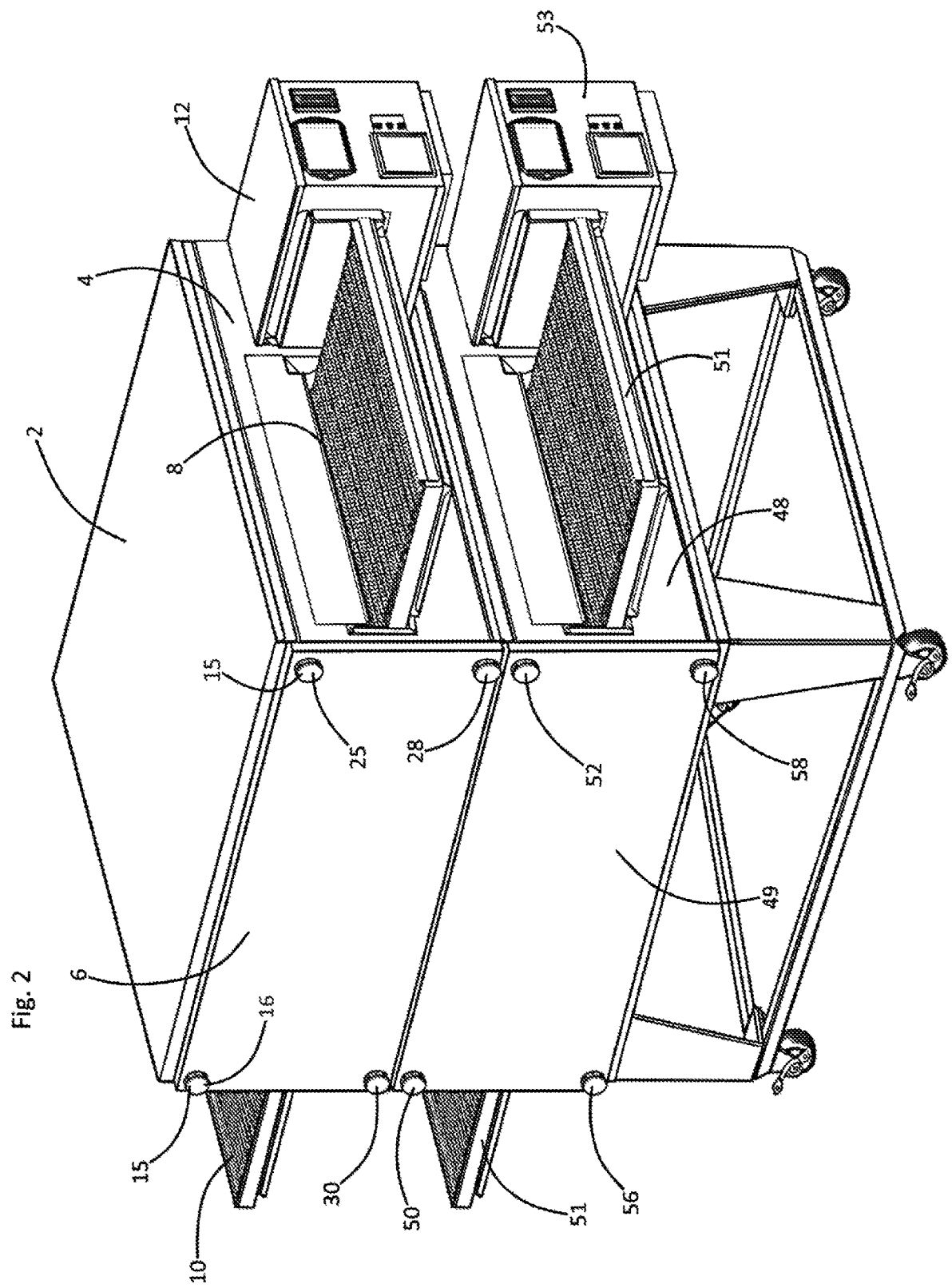
FIG. 2 redepicts the structure of FIG. 1, the view of FIG. 2 showing upper and lower "J" hook configured auxiliary panels removed.
Figure 3:
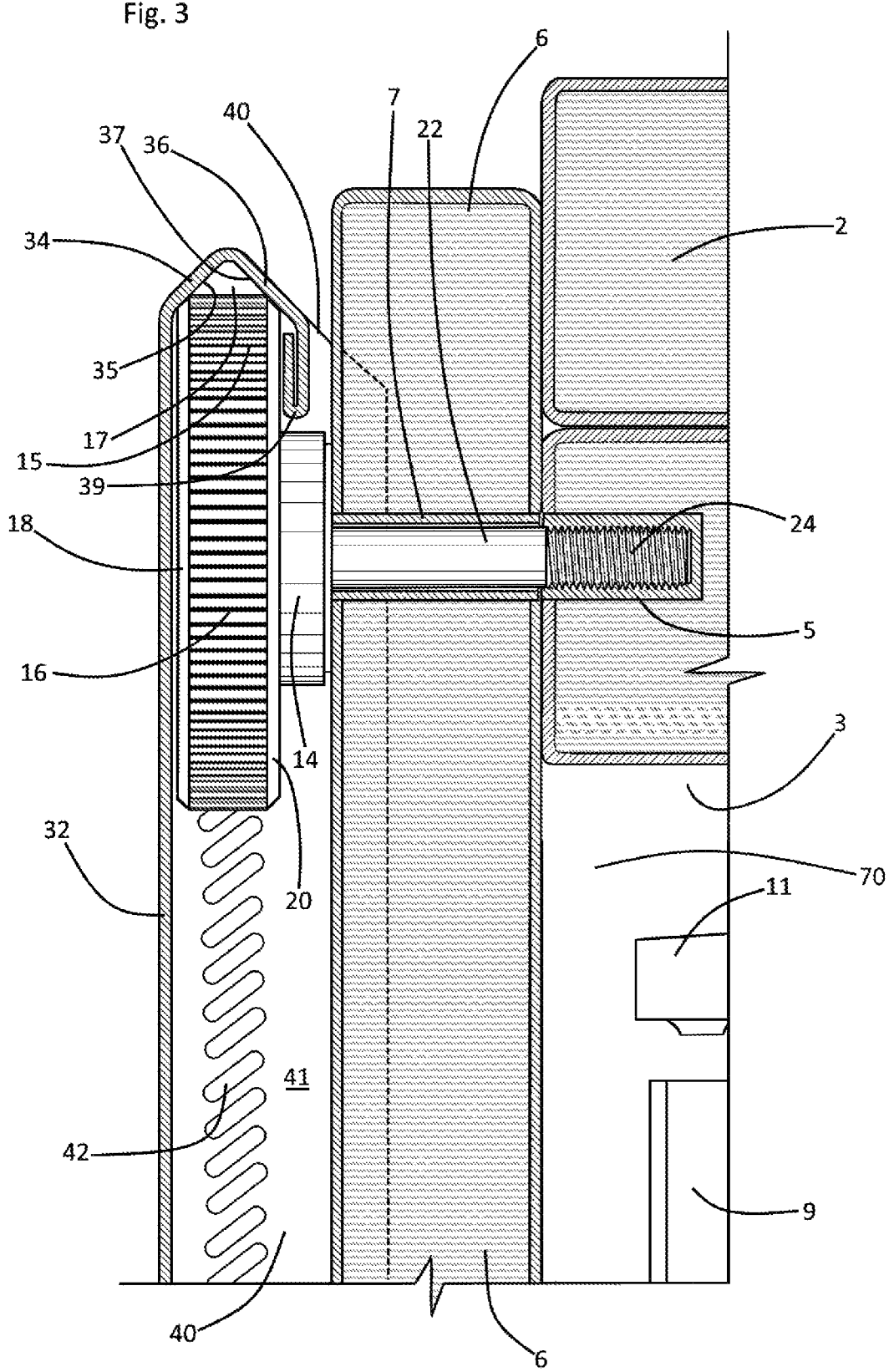
FIG. 3 is a partial sectional view as indicated in FIG. 1.
Figure 4:
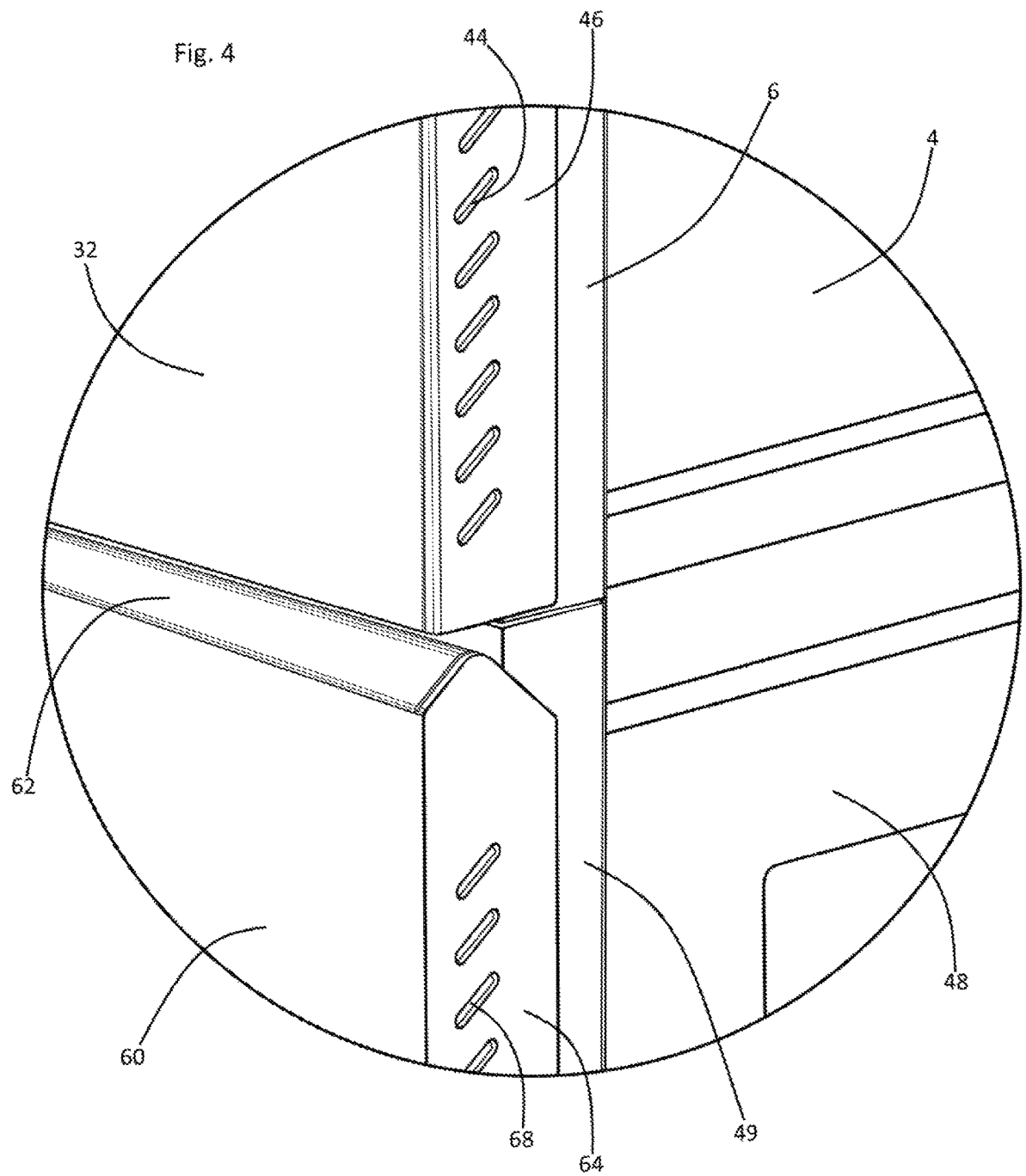
FIG. 4 is a magnified partial view as indicated in FIG. 1.

Referring now to the drawings, and in particular to Drawing FIG. 1, a preferred embodiment of the instant inventive conveyor tunnel oven is referred to generally by Reference Arrow 1. The oven 1 has an upper wall or ceiling 2, a lower wall or floor (not depicted within views) underlying the upper wall 2, and a longitudinal wall 4. Referring further simultaneously to FIGS. 2-4, the oven's case component further includes an oppositely longitudinal wall 3, a forward opening 70, and a rear wall (not depicted within views) positioned rearwardly from the forward opening 70. Longitudinal and oppositely longitudinal food passage ports 8 and 9 further open the interior of the baking case component at its longitudinal and oppositely longitudinal walls 4 and 3, and a grate type continuous loop conveyor 10 extends through the baking case to protrude from such ports. Heated air jetting finger ducts 11 are preferably arrayed within the case above and below the conveyor 10 for impingement air cooking carried food items such as pizzas.

An insulated front panel 6 is fitted for covering and closing the oven's forward opening 70, such panel 6 including mounting pin receiving eyes 7 positioned at each of its four corners. Associated with the eyes 7, the instant invention necessarily incorporates at least a pair of "L" hooks 16 and 25, each such hook having a stem portion 22, and having an upwardly extending foot portion 15. In the preferred embodiment, the "L" hooks' stem portions 22 have helically threaded rearward ends 24 which may threadedly engage forwardly opening internally helically threaded sockets 5 which are recessed within the forward face of the baking case at the periphery of opening 70. The foot portions 15 of the invention's "L" hook components 16 and 25 preferably comprise upwardly oriented ends or circumferential portions of enlarged disk configured heads, such heads being fixedly and rigidly attached to the forward ends of the stem sections 22 via spacer sections 14. In the preferred embodiment, such enlarged heads have peripheral frictional knurling, and include front and rear annular bevels or chamfers 18 and 20, the functions of which are further discussed below.

Referring in particular to FIG. 3, a further structural component of the instant inventive oven comprises a "J" hook having a stem section 32 and having an upper tail section 34, 36. In the preferred embodiment, the "J" hook 32, 34, 36, forms and defines a downwardly opening hook throat 17 which extends in the longitudinal/oppositely longitudinal direction. The throat 17 is preferably closely fitted for receiving the upturned feet 15 of the invention's "L" hook components 16 and 25.

In the preferred embodiment, the downwardly suspended stem portion 32 of the invention's "J" hook component is panel or sheet configured so that it may substantially coextensively overlie the forward surface of the oven's removable front panel 6. Angular spans or faces of the "J" hook's tail section 34, 36 preferably match the chamfer or bevel angles 18 and 20 of the "L" hooks' disk shaped heads so that, upon upward nesting insertions of feet 15 into the "J" hook's downwardly opening throat 17, abutting contacts of the uppermost ends of chamfers 18 and 20 against the throat's angled interior throat surfaces 35 and 37 may securely center and hold the feet 15 within the throat 17. Upper vents 45 presented at the apex of "J" hook's tail sections 34 and 36 advantageously aspirate heated air from the air gap 41 which is defined between stem section 32 and the forward surface of panel 6.

In the preferred embodiment, stop flanges 46 and 40 preferably extend rearwardly from and are respectively fixedly attached to the longitudinal and oppositely longitudinal ends of the "J" hook's stem section 32. Upon a suspending installation of the "J" hook component as indicated in FIGS. 1 and 3, the stop flanges 46 and 40 respectively longitudinally and oppositely longitudinally overlie the longitudinal and oppositely longitudinal ends of the cover panel 6. Such overlying positions of the stop flanges 46 and 40 advantageously resist any undesirable oppositely longitudinal or longitudinal sliding motion of the "J" hook 32, 34, 36, away from a desired longitudinally centered position over panel 6 as depicted in FIG. 1. For additional heat venting and cooling of air gap 41, longitudinal and oppositely longitudinal arrays of vents 44 and 42 are preferably provided for further convective cooling.

Lower panel fastening heads 28 and 30, which are provided for additionally securing the panel 6 over the forward opening 70 of the oven, perform additional functions of vertically positioning and aligning the lower end of the "J" hook 32, 34, 36, such lower heads 28 and 30 maintaining vertical consistency of the width or front to rear dimension of the air gap 41.

In use of the instant inventive conveyor tunnel oven assembly, an oven operator may initially grasp the "J" hook 32, 34, 36, by its upper tail component, the operator suitably using fingertips to hold and carrying the distal end of such hook tail in the manner of a handle. To facilitate such carrying use of the "J" hook use, the distal end of hook's tail is preferably configured to include a "U" bend 39 which enhances the structural rigidity of the "J" hook's tail and prevents finger cuts.

While so holding and carrying the "J" hook, the operator may position the "J" hook so that the downwardly opening throat 17 vertically overlies the "L" hooks' upturned feet 15. Thereafter, the operator may manually lower the "J" hook until each foot 15 enters the throat 17, and until the throat's angled interior faces 35 and 37 abut the annular chamfers 18 and 20.

Following an attachment and assembly as indicated in FIG. 3, convective flows of heated air within air gap 41 emit from vents 44, 42, and 45. As the heated air emits from vents 44, 42, and 45, relatively cool ambient air simultaneously enters air gap 41 at its open lower end. Such exchange of heated air with cooler air assures that the "J" hook's stem section 32 remains substantially cooler than the forward surface of panel 6, such temperature differential advantageously preventing contact burns of operators working closely with or about the oven 1.

To facilitate an opposite removal of the "J" hook component 32, 34, 36, the operator may grasp the longitudinal and oppositely longitudinal ends of the stem section 32, utilizing the arrays of vents 44 and 42 as fingertip friction enhancing knurling of the otherwise smooth stop flanges 46 and 40. Upon so grasping the longitudinal sides of the "J"

hook, the operator may easily and conveniently raise the "J" hook away from its engagement with the "L" hooks 16 and 25. Such "J" hook removal easily and conveniently facilitates a subsequent detachment of the newly exposed panel 6.

As shown in FIGS. 1 and 2, a second and underlying conveyor tunnel oven similarly including a longitudinal wall 48, a conveyor 51, a control case 53, a removable front panel 49, and enlarged head panel fasteners 50, 52, 56, and 58, may be additionally incorporated within the assembly of the instant invention. In such configuration, a second and underlying "J" hook configured panel 60 may be provided, such panel similarly having side flanges 64, side vents 68, an upper tail portion 62, and upper vents 63. In the FIG. 1 configuration, a substantially continuous cooled front 32, 60 is provided, such front being easily and conveniently assembled and disassembled.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A conveyor tunnel oven comprising:
   (a) a forwardly opening baking case comprising a rear wall, a longitudinal wall, an oppositely longitudinal wall, an upper wall and a lower wall, said case being further opened by a longitudinal food passage port and an oppositely longitudinal food passage port;
   (b) a continuous loop conveyor within the baking case, said conveyor extending to the longitudinal and oppositely longitudinal food passage ports;
   (c) a panel having a forward surface, the panel being fitted for closing the baking case's forward opening;
   (d) first and second "L" hooks, each such hook comprising a helically threaded stem and a foot, said hooks positioning the panel over the baking case's forward opening;
   (e) first and second disks respectively fixedly attached to the first and second "L" hooks' helically threaded stems, said hooks' feet respectively comprising upturned portions of the first and second disks;
   (f) a "J" hook having a panel configured stem and a tail, wherein the said hook's tail has a distal end, wherein said hook's tail engages the first and second "L" hooks' feet, and wherein said hook's stem has longitudinal and oppositely longitudinal ends and overlies the panel's forward surface;
   (g) longitudinal and oppositely longitudinal flanges fixedly attached to the panel configured stem, said flanges respectively extending rearwardly from said stem's longitudinal and oppositely longitudinal ends; and
   (h) first and second panel fastening heads respectively underlying the first and second disks, said heads vertically aligning the panel configured stem.

2. The conveyor tunnel oven of claim 1 further comprising an air gap between the "J" hook's panel configured stem and the panel, the air gap being upwardly opened.

3. The conveyor tunnel oven of claim 2 further comprising longitudinal and oppositely longitudinal pluralities of vents, said vent pluralities further opening the air gap and being respectively positioned at the longitudinal and oppositely longitudinal flanges.

4. The conveyor tunnel oven of claim 3 further comprising a carry handle positioned at the distal end of the "J" hook's tail.

5. The conveyor tunnel oven of claim 4 wherein the carry handle comprises a "U" bend.

6. The conveyor tunnel oven of claim 5 wherein the "J" hook's tail has a pair of angled inner faces, wherein each disk has front and rear annular chamfers, and wherein said chamfers are fitted for abutting contacts with the angled inner faces.

7. A conveyor tunnel oven comprising:
   (a) a forwardly opening baking case comprising a rear wall, a longitudinal wall, an oppositely longitudinal wall, an upper wall and a lower wall, said case being further opened by a longitudinal food passage port and an oppositely longitudinal food passage port;
   (b) a continuous loop conveyor within the baking case, said conveyor extending to the longitudinal and oppositely longitudinal food passage ports;
   (c) a panel having a forward surface, the panel being fitted for closing the baking case's forward opening;
   (d) first and second "L" hooks, each such hook comprising a helically threaded stem and a foot, said hooks positioning the panel over the baking case's forward opening; and
   (e) first and second disks respectively fixedly attached to the first and second "L" hooks' helically threaded stems, said hooks' feet respectively comprising upturned portions of the first and second disks;
   (f) a "J" hook having a panel configured stem and a tail, wherein the said hook's tail has a distal end, wherein said hook's tail engages the first and second "L" hooks' feet, and wherein said hook's stem has longitudinal and oppositely longitudinal ends and overlies the panel's forward surface;
   (g) longitudinal and oppositely longitudinal flanges fixedly attached to the panel configured stem, said flanges respectively extending rearwardly from said stem's longitudinal and oppositely longitudinal ends;
   (h) an air gap between the "J" hook's panel configured stem and the panel, the air gap being upwardly opened; and
   (i) longitudinal and oppositely longitudinal pluralities of vents, said vent pluralities further opening the air gap and being respectively positioned at the longitudinal and oppositely longitudinal flanges.

8. The conveyor tunnel oven of claim 7 further comprising a carry handle positioned at the distal end of the "J" hook's tail.

9. The conveyor tunnel oven of claim 8 wherein the carry handle comprises a "U" bend.

10. The conveyor tunnel oven of claim 9 wherein the "J" hook's tail has a pair of angled inner faces, wherein each disk has front and rear annular chamfers, and wherein said chamfers are fitted for abutting contacts with the angled inner faces.

11. A conveyor tunnel oven comprising:
    (a) a forwardly opening baking case comprising a rear wall, a longitudinal wall, an oppositely longitudinal wall, an upper wall and a lower wall, said case being further opened by a longitudinal food passage port and an oppositely longitudinal food passage port;
    (b) a continuous loop conveyor within the baking case, said conveyor extending to the longitudinal and oppositely longitudinal food passage ports;
    (c) a panel having a forward surface, the panel being fitted for closing the baking case's forward opening;

(d) first and second "L" hooks, each such hook comprising a helically threaded stem and a foot, said hooks positioning the panel over the baking case's forward opening;

(e) first and second disks respectively fixedly attached to the first and second "L" hooks' helically threaded stems, said hooks' feet respectively comprising upturned portions of the first and second disks;

(f) a "J" hook having a panel configured stem and a tail, wherein the said hook's tail has a distal end, wherein said hook's tail engages the first and second "L" hooks' feet, and wherein said hook's stem has longitudinal and oppositely longitudinal ends and overlies the panel's forward surface;

(g) longitudinal and oppositely longitudinal flanges fixedly attached to the panel configured stem, said flanges respectively extending rearwardly from said stem's longitudinal and oppositely longitudinal ends;

(h) an air gap between the "J" hook's panel configured stem and the panel, the air gap being opened by an upper plurality of vents, said vents being positioned at the "J" hook's tail; and (i) longitudinal and oppositely longitudinal pluralities of vents, said vent pluralities further opening the air gap and being respectively positioned at the longitudinal and oppositely longitudinal flanges.

12. The conveyor tunnel oven of claim 11 further comprising a carry handle positioned at the distal end of the "J" hook's tail.

13. The conveyor tunnel oven of claim 12 wherein the carry handle comprises a "U" bend.

14. The conveyor tunnel oven of claim 13 wherein the "J" hook's tail has a pair of angled inner faces, wherein each disk has front and rear annular chamfers, and wherein said chamfers are fitted for abutting contacts with the angled inner faces.

* * * * *